United States Patent
Breuer et al.

(10) Patent No.: US 10,836,301 B2
(45) Date of Patent: Nov. 17, 2020

(54) LIGHTING SYSTEM FOR ASCERTAINING GEOMETRIC PROPERTIES, AND DRIVER ASSISTANCE SYSTEM AND METHOD THEREFOR

(71) Applicants: Conti Temic microelectronic GmbH, Nuremberg (DE); Continental Automotive GmbH, Hannover (DE)

(72) Inventors: Karsten Breuer, Oberreute (DE); Thomas Fechner, Wasserburg (DE); Dieter Kroekel, Eriskirch (DE); Steffen Goermer, Winterrieden (DE); Tobias Schwarz, Dornstadt (DE); Bruno Nunes-Silva, Bodman-Ludwigshafen (DE); Christopher Kuenzel, Vienna (AT); Maximilian Austerer, Vienna (AT)

(73) Assignees: Conti Temic microelectronic GmbH, Nuremberg (DE); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/464,803

(22) PCT Filed: Nov. 24, 2017

(86) PCT No.: PCT/DE2017/200120
§ 371 (c)(1),
(2) Date: May 29, 2019

(87) PCT Pub. No.: WO2018/099525
PCT Pub. Date: Jun. 7, 2018

(65) Prior Publication Data
US 2019/0344702 A1 Nov. 14, 2019

(30) Foreign Application Priority Data
Nov. 29, 2016 (DE) .................... 10 2016 223 671

(51) Int. Cl.
*B60Q 1/06* (2006.01)
*B60Q 1/00* (2006.01)
(Continued)

(52) U.S. Cl.
CPC ............ *B60Q 1/0023* (2013.01); *B60Q 1/06* (2013.01); *F21S 41/60* (2018.01); *G01B 11/026* (2013.01); *G06K 9/00805* (2013.01)

(58) Field of Classification Search
CPC .............................. B60Q 1/0023; F21S 41/60
(Continued)

(56) References Cited

U.S. PATENT DOCUMENTS

| 7,720,260 B2 | 5/2010 | Macneille et al. |
| 2015/0254819 A1 | 9/2015 | Hara |

(Continued)

FOREIGN PATENT DOCUMENTS

| DE | 197 30 414 | 1/1999 |
| DE | 197 49 435 | 5/1999 |

(Continued)

OTHER PUBLICATIONS

English translation of the International Search Report of the International Searching Authority for International Application PCT/DE2017/200120, dated Feb. 27, 2018, 3 pages, European Patent Office, HV Rijswijk, Netherlands.

(Continued)

*Primary Examiner* — Christopher M Raabe
(74) *Attorney, Agent, or Firm* — W. F. Fasse

(57) ABSTRACT

A driver assistance system of a motor vehicle includes a lighting system of the motor vehicle, having an illumination unit that illuminates a scene in the surroundings of the vehicle by projecting a number of actuatable pixels, whereby the illumination unit projects a predefined pattern onto the scene. An image capture unit captures an image of (Continued)

at least part of the scene. A computation unit computes at least one geometric property of the scene based on the captured image and the predefined pattern.

18 Claims, 2 Drawing Sheets

(51) Int. Cl.
  *F21S 41/60* (2018.01)
  *G01B 11/02* (2006.01)
  *G06K 9/00* (2006.01)
(58) Field of Classification Search
  USPC .......................................................... 362/466
  See application file for complete search history.

(56) References Cited

U.S. PATENT DOCUMENTS

| | | | | |
|---|---|---|---|---|
| 2016/0033102 A1* | 2/2016 | Hiratsuka | ................. | G06T 7/70 362/466 |
| 2017/0225611 A1* | 8/2017 | Kim | ....................... | B60Q 1/085 |
| 2020/0010011 A1* | 1/2020 | Soehner | ............... | B60Q 1/0023 |
| 2020/0055442 A1* | 2/2020 | Epperlein | ............... | F21S 41/60 |

FOREIGN PATENT DOCUMENTS

| | | |
|---|---|---|
| DE | 102007040176 | 3/2008 |
| DE | 102008042012 | 3/2010 |
| DE | 202015105376 | 10/2015 |
| EP | 2 278 270 | 1/2011 |
| WO | WO 2016/091813 | 6/2016 |

OTHER PUBLICATIONS

PCT International Preliminary Report on Patentability including English Translation of PCT Written Opinion of the International Searching Authority for International Application PCT/DE2017/200120, dated Jun. 4, 2019, 6 pages, International Bureau of WIPO, Geneva, Switzerland.

German Search Report for German Patent Application No. 10 2016 223 671.7, dated May 31, 2017, 8 pages, German Patent and Trademark Office, Muenchen, Germany, with partial English translation, 6 pages.

\* cited by examiner

LIGHTING SYSTEM FOR ASCERTAINING GEOMETRIC PROPERTIES, AND DRIVER ASSISTANCE SYSTEM AND METHOD THEREFOR

TITLE OF THE INVENTION

FIELD OF THE INVENTION

The present invention relates to a lighting system for illuminating a scene in the surroundings of a motor vehicle. The invention likewise relates to a corresponding driver assistance system, a corresponding method and corresponding uses of a projection-type headlight of a motor vehicle.

BACKGROUND OF THE INVENTION

The area of application of the invention extends to driver assistance systems, in particular of motor vehicles. In order to be able to react dynamically to the surroundings of the motor vehicle in traffic, in particular to be able to judge the roadway in advance, driver assistance systems require instruments, by means of which geometric properties such as, for example, the spatial distance of specific parts of the surroundings from the vehicle can be established.

The generally known prior art discloses driver assistance systems in which positions or respectively distances are measured using mono cameras with the aid of methods which are based on e.g. motion-stereo or on the interpretation of the change in width for known classes of objects or on the interpretation of the height of a base point of an object. The disadvantage of these methods is that they require good contrast conditions, for example daylight.

A method for look-ahead or advance evaluation of the condition of a roadway, on which the wheels of a motor vehicle are rolling, is known from DE 19730414 A1, wherein a laser light pattern output by a laser beam source is evaluated using the triangulation method.

The disadvantage of the aforementioned method is that either the camera used has to be sensitive to infrared (NIR/IR), which is, in turn, disadvantageous due to the fact that the perception of colors is distorted in the visible spectral region, or the laser light patterns have to lie within the visible spectral region, which can be troublesome for the driver or other road users and, consequently, causes a road traffic hazard. In addition, a separate light source has to be provided in order to output the laser light pattern.

SUMMARY OF THE INVENTION

It is therefore the object of the present invention to create a lighting system or respectively detection system in order to improve the operation of a driver assistance system, which also makes it possible to judge the roadway or respectively the surroundings in advance, even in poor lighting conditions and without troubling the driver.

The object can be achieved, by a driver assistance system of a motor vehicle, by a method of computing a geometric property of a scene, and by using a projection-type headlight of a motor vehicle, respectively according to the invention with the features as set forth herein.

The invention includes the technical teaching that a lighting system or respectively a headlight system for a motor vehicle includes an illumination unit configured to illuminate a scene in the surroundings of the vehicle by projecting a total area, consisting of a total number of actuatable pixels, wherein the illumination unit or respectively the headlight system is configured to project a predefined pattern onto the scene; an image capture unit configured to capture an image of at least part of the scene; and a computation unit configured to compute at least one geometric property of the scene by means of the captured image and the predefined pattern.

The 'actuatability' of the pixels means that the pixels are actuatable in terms of their brightness and/or color.

In this case, the total area or respectively the total luminous area of all of the pixels of the headlight system, which can be projected or respectively is projected onto the scene, is, for example, complete or, for example, unbroken or, for example, continuous. In this case, the darkening of the subgroup of pixels remains, for example, of no effect for all the remaining pixels of the total area. Alternatively, the pixels of the total area, which are in each case adjacent to the pixels of the subgroup, can also be made brighter in order to increase the contrast.

The image capture unit includes, for example, a camera which is, for example, not sensitive to IR or NIR. The advantage of the lighting system according to the invention can, for example, be seen in that the patterns thus projected can be detected with standard cameras which are not (N)IR sensitive.

According to a preferred configuration, the lighting system comprises one or both headlights of the motor vehicle as the illumination unit. In other words, the headlights take on the task of projecting the pattern. Headlights which are capable of this are projection-type headlights which project a plurality of actuatable pixels into the surroundings of the motor vehicle.

The illumination unit is advantageously configured to project the predefined pattern onto the scene by darkening a subgroup of pixels. The darkening comprises, for example, reducing the brightness relative to adjacent pixels. The darkening can be brought about, for example, by switching off or completely darkening the respective pixels or by dimming them.

A subgroup of pixels is preferably darkened in such a way that the pattern cannot be perceived by the driver, but can be perceived by the image capture unit.
Nevertheless, the pattern remains, for example, invisible to the driver or, for example, cannot be perceived by the driver, since dark pixels or spots attract less attention than corresponding luminous markings.

One preferred embodiment envisages that, in order to realize switchable pixels, a chip having movable micromirrors (DMD—digital micromirror device)—having preferably more than 10, in particular more than 100, in particular more than 1000 mirror elements, is positioned in the light path such that the luminous flux exiting from the headlight can be influenced locally. This technology for headlight systems is already fundamentally known to the expert as "pixel light" for headlights of motor vehicles, in which the illumination characteristic of the headlight is continually adapted, for example, as a function of the course of the road or other road users.

Another preferred embodiment envisages that, in order to realize switchable pixels, the headlight system has a number of illumination sources—in particular LEDs—which can be switched independently, so that the luminous flux exiting from the headlight can be influenced locally. In this case, the headlight system preferably has more than 10, in particular more than 100, in particular more than 1000 individual illumination sources. This technology for headlight systems is already fundamentally known to the expert for headlights of motor vehicles, in which the illumination characteristic of the headlight is continually adapted, for example, as a function of the course of the road or other road users.

A preferred embodiment of the invention envisages that the number of pixels of the subgroup is less than half, in particular less than a quarter, in particular less than a tenth, in particular less than a hundredth, in particular less than a thousandth of the total number of pixels. The number of pixels of the subgroup can also be even smaller than a thousandth of the total number of pixels.

This makes it possible for the visual impression that the pattern has on the senses of the driver or other road users to mainly be created by the total area, whereas the smaller or much smaller subgroup of darkened pixels is less conspicuous or not conspicuous, or can be perceived less or not at all.

Another preferred embodiment envisages that the pixels of the subgroup do not at any point overlay a circle having a radius of more than 1, in particular 5, in particular 10, in particular 25, in particular 50, in particular 100 pixels. In this case, a circle having a radius of one pixel consists of precisely one pixel. A circle having a radius of, for example, two pixels would be, for example, a field of 3 times 3 pixels.

This further guarantees that no larger or extensive areas or spots are created, which can be optically better perceived than smaller continuous areas or thin lines which, due to the thin configuration, only completely overlay circles having small radii. The ideal maximum width of the adjacent pixels of the subgroup, which should actually be selected, depends, in this case, on the imaging properties of the illumination unit, for example on the physical spatial extent of a pixel which is to be expected on the roadway and the resolution of the image capture unit.

Another advantageous embodiment envisages that the pixels of the subgroup form points and/or bent and/or straight lines, for example crosses or triangles or grid patterns or grid lines.

These figures are particularly easy to process for image recognition algorithms.

A particularly preferred embodiment involves the illumination unit being configured to project the pattern only during specific pattern time intervals.

As a result, the complete, unaltered total area is projected during the periods of time which lie outside the pattern time intervals, so that the possibility of the driver being troubled during the latter periods of time is excluded.

Another improvement of this embodiment envisages that the computation unit only uses images captured during the pattern time intervals. This can happen, for example, in that the image capture unit only captures images during these pattern time intervals, or in that the computation unit only uses the subgroup of the continually captured images which were created during the pattern time intervals for the calculation.

This not only minimizes the computing outlay and consequently reduces the runtime, that is to say the process is made faster, but also, if necessary, improves contrast since no images which do not have the pattern are analyzed.

Building thereon, another preferred embodiment envisages that the pattern time intervals are in each case shorter than one second divided by 1, in particular 2, in particular 4, in particular 10, in particular 24, in particular 30, in particular 60, in particular 120.

This guarantees that the intervals within which the total area is projected with a darkened shadow pattern are very short and, consequently, even less perceptible to the driver. On the other hand, a camera of the image capture unit can easily capture even those patterns which occur briefly.

Another embodiment envisages that the image capture unit captures the image cyclically at capturing start times over an unalterable minimum capturing period, wherein the start time of a time interval is coupled to some or all of the capturing start times.

In other words, the illumination unit is coupled to the frame rate, which corresponds to the unalterable minimum capturing period, of the image capture unit, or is synchronized therewith. For example, the illumination unit is configured to only start a pattern time interval at the precise moment—that is to say to only darken the pixels of the subgroup at the precise moment—that a frame of the image capture unit is starting or is imminent.

As a result, a particularly good contrast is achieved, because the pixels of the subgroup are consequently darkened during the period of time in which an image is captured, and are not bright like the remaining total area. At the same time, the pattern is also prevented from being displayed for an unnecessarily long period of time, for example if the image capture unit does not capture an image, which could bother the driver.

This embodiment is further improved in that the length of a pattern time interval substantially corresponds to a multiple of the capturing period.

For example, the multiple can be one time, two times, three times or any higher whole-number multiple of times. Consequently, not only is the start time of the pattern time interval coupled to the frame rate of the image capture unit or a camera assigned to the latter, but also the end time thereof. This creates a particularly good contrast despite the fact that the period of time for which the pattern is displayed, which could otherwise be troublesome, is kept to a minimum.

The scene is preferably arranged in front of and/or next to and/or behind the motor vehicle. Consequently, at least one geometric property of the surroundings can be computed at any point as the "surround view".

Another preferred embodiment of the invention envisages that the at least one geometric property comprises a position of at least part of the scene or a spatial distance of at least part of the scene from a reference point. The reference point is, for example, a part of the motor vehicle or a part of the image capture device or another part of the scene.

Likewise, the at least one geometric property can comprise irregularities of the scene, for example in order to recognize gravel or potholes.

The illumination unit is particularly preferably configured as a projection-type headlight which projects the pattern by means of a micromirror array. As a result, a particularly rapid actuation of the pixels which is rich in contrast can be realized at the same time as a bright and effective illumination of the scene.

The object is likewise achieved by a method for computing at least one geometric property of a scene, comprising steps, during which a scene in the surroundings of a vehicle is illuminated by projecting a total area, consisting of a total number of actuatable pixels, by means of an illumination device of the vehicle; and
a predefined pattern is projected onto the scene by darkening a subgroup of pixels; and an image of at least part of the scene is captured; and at least one geometric property of the scene is computed by means of the captured image and the predefined pattern.

A projection-type headlight of a motor vehicle, which projects by means of a micromirror array, can particularly preferably be used as the illumination device in order to solve the problem.

As a result, the installation of a standalone illumination unit is avoided and, instead, the existing micromirror array is deployed, thus simplifying the technical production of the lighting system.

BRIEF DESCRIPTION OF THE FIGURES

Further measures which improve the invention are represented in greater detail below, together with the description of preferred exemplary embodiments of the invention, with reference to two figures, wherein.

DETAILED DESCRIPTION OF THE INVENTION

Figure 1A:
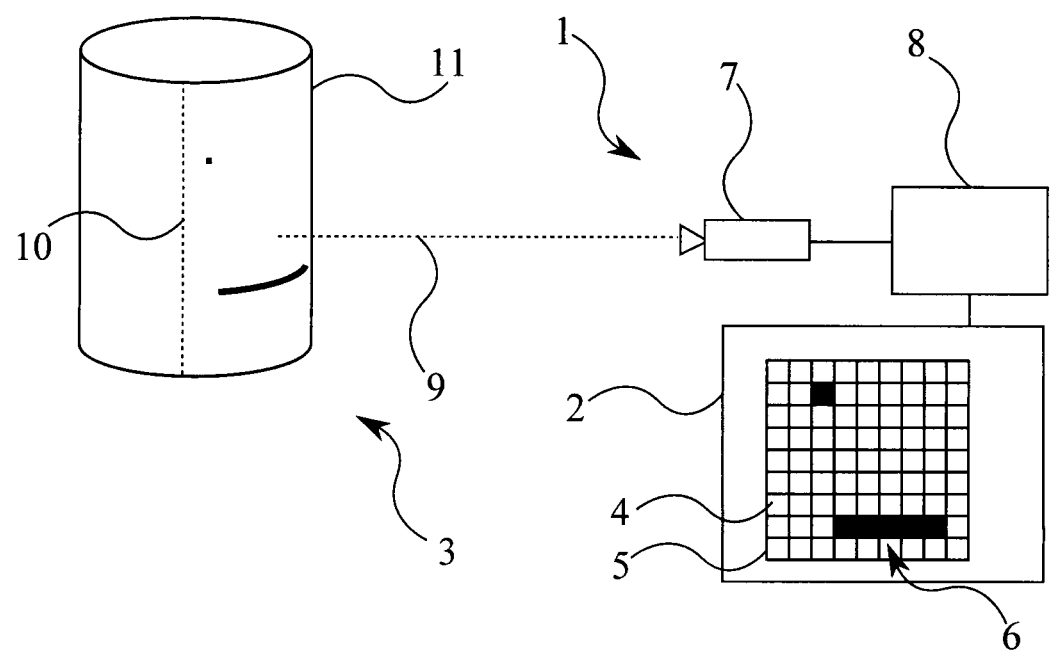
FIG. 1a shows a diagram of an exemplary embodiment of the invention.

According to FIG. 1a, the driver assistance system comprises a lighting system or respectively a headlight system 1 for a motor vehicle having an illumination unit 2. Said illumination unit is configured to illuminate a scene 3 in the surroundings of the vehicle by projecting a total area 5, consisting of a total number of actuatable pixels 4. The two headlights of the motor vehicle are preferably used as the illumination unit 2, wherein the headlights are projection-type headlights which project a large number of individually actuatable pixels into the surroundings of the vehicle.

The illumination unit 2 is in particular configured to project a predefined pattern, consisting of lines and dots, onto the scene by darkening a subgroup 6 of pixels 4. The subgroup 6 is marked by black pixels 4 and consists of these. The pattern has precisely the form of the darkened pixels 4, that is to say of the subgroup, and consists of these. The grid lines between the pixels 4 merely serve to represent these better and are not part of the total area or of the pattern.

The driver assistance system further comprises an image capture unit 7 which is configured to capture an image of at least one part of the scene, and a computation unit 8 configured to compute at least one geometric property 9; 10 of the scene by means of the captured image and the predefined pattern.

In the represented example, the computation unit 8 computes—by means of the predefined pattern and the image thereof, which is geometrically distorted by being projected onto a cylindrical object 11—both the geometric property 9 in the form of the distance of the image capture unit from the object 11 and the geometric property 10 in the form of the height thereof. Likewise, the radius of curvature of the object can, for example, be computed. Similarly, it would be possible to compute properties of the roadway—which is not represented further here, such as the curvature thereof and structural peculiarities such as the presence of gravel or dimensions of potholes, or distances of any points within the illuminated scene. To this end, the computation unit uses a recorded calibration for example.

According to the represented example, the number of pixels 4 of the subgroup 6, consisting of six pixels, is less than one tenth of the eighty-one pixels 4 of the total area 5. Consequently, the markings do not stand out visually.

In addition, the pixels 4 of the subgroup 6 are arranged in such a way that a circle having a radius of more than one pixel is not overlapped at any point. That is to say, only thin lines or dots are created, which can be less obviously perceived by a road user due to the physical characteristics of human perception.

In this case, the illumination unit 2 is configured as a projection-type headlight which projects the pattern by means of a micromirror array. If, for example, a projection-type headlight of the motor vehicle is used as an illumination unit 2, no additional illumination unit has to be provided.

Figure 1B:
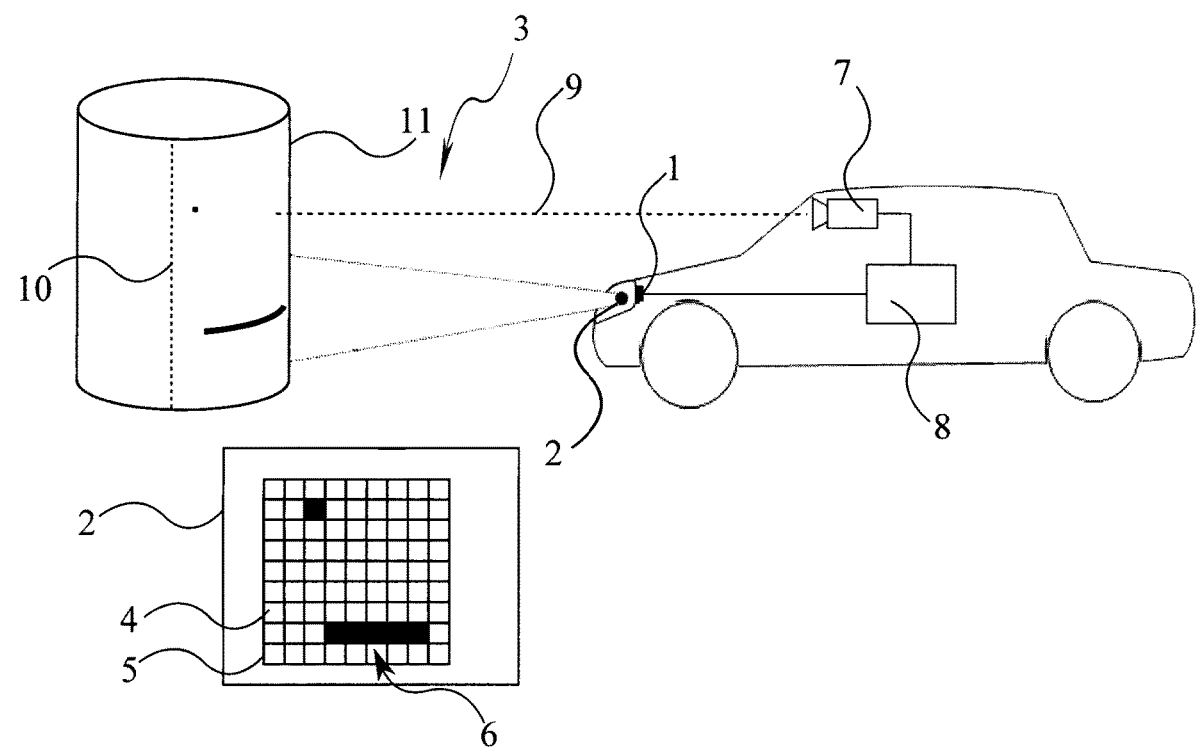
FIG. 1b schematically shows a vehicle having a driver assistance system.

FIG. 1b illustrates an integration of the elements represented in FIG. 1a into a motor vehicle. A headlight of the motor vehicle constitutes an illumination unit 2 of the lighting system 1. The headlight is a projection-type headlight which projects a large number of individually actuatable pixels 4 into the surroundings of the motor vehicle. A forward-facing, preferably monocular camera which is arranged behind the windshield in the motor vehicle serves as the image capture unit 7. The camera captures the surroundings of the motor vehicle, together with the pattern projected by the lighting system.

Figure 2:
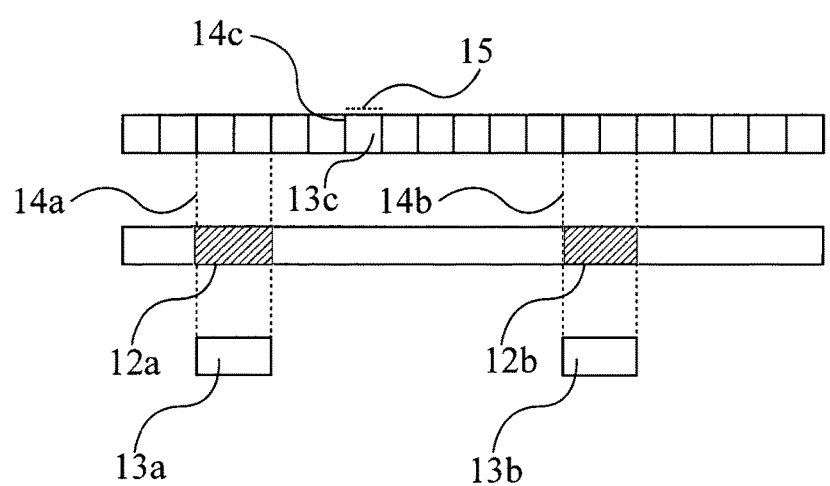
FIG. 2 shows a diagram of another exemplary embodiment of the invention.

According to FIG. 2, the illumination unit 2 is configured to only project the pattern during specific pattern time intervals 12a, 12b. These intervals are identified here as black fields on a timeline. In addition, the computation unit 8 only uses images 13a, 13b captured during the pattern time intervals 12a, 12b.

For example, the image capture unit 7 can, in each case, continually capture images 13c at capturing start times 14c over an unalterable minimum capturing period 15.

In this example, the image capture unit only captures the images 13a, 13b at capturing start times 14a, 14b. In this case, the start times of the pattern time intervals 12a; 12b—triggered by the illumination unit—are coupled to the capturing start times 14a, 14b.

In addition, the length of a pattern time interval 12a; 12b corresponds substantially to, for example, twice the capturing period 15.

In the case of the first image 13a, the start time of the first pattern time interval 12a is slightly earlier than the first capturing start time 14a and the length of the first pattern time interval 12a is slightly longer than twice the capturing period 15, as a result of which a maximally high contrast is achieved, but the pattern is also displayed for slightly longer than necessary.

In the case of the second image 13b, the start time of the second pattern time interval 12b is slightly later than the second capturing start time 14b and the length of the second pattern time interval 12b is slightly shorter than twice the capturing period 15, as a result of which a slightly diminished contrast is achieved, but the pattern is not displayed for longer than necessary.

Consequently, it would not be possible, for example, for a driver to perceive a projection of a pattern during a short pattern time interval since, as a result, the perceived brightness of the corresponding pixels 4 effectively falls by just a few percent. If, on the other hand, the marking were to not be hidden but instead displayed, given the black background of the roadway or the scene, an infinitely high contrast—that is to say a greater disruption for the driver—would be created, by displaying even only slightly luminous pixels 4, while having the same suitability for further processing by the computation unit 8.

The invention is not limited to the preferred exemplary embodiments described above. Rather, variations of these are also conceivable, which are also included in the scope of protection of the following claims. Thus, it is for example also possible that the image capture unit comprises multiple cameras or that the illumination unit comprises multiple micromirror arrays.

The invention claimed is:

1. A driver assistance system of a motor vehicle including a lighting system of the motor vehicle, comprising:
    an illumination unit configured to illuminate a scene in surroundings of the vehicle by projecting a total area consisting of a total number of actuatable pixels, wherein the illumination unit is configured to project a predefined pattern onto the scene by darkening at least one subgroup of the actuatable pixels, wherein a number of the actuatable pixels of the at least one subgroup that are darkened for projecting the predefined pattern is less than half the total number of the actuatable pixels;
    an image capture unit configured to capture images of at least part of the scene; and
    a computation unit configured to compute at least one geometric property of the scene from at least some of the captured images and the predefined pattern.

2. The driver assistance system according to claim 1, wherein the illumination unit comprises two headlights of the motor vehicle.

3. The driver assistance system according to claim 1, wherein the illumination unit is configured so that the actuatable pixels of the at least one subgroup do not at any point overlay a virtual circle having a radius equivalent to more than 50 of the actuatable pixels.

4. The driver assistance system according to claim 1, wherein the illumination unit is configured to project the predefined pattern only during specific pattern time intervals.

5. The driver assistance system according to claim 4, wherein the computation unit is configured to use only ones of the images captured during the specific pattern time intervals for computing the at least one geometric property.

6. The driver assistance system according to claim 4, wherein the specific pattern time intervals are each respectively shorter than one second.

7. The driver assistance system according to claim 4,
    wherein the image capture unit is configured to capture the images respectively cyclically at capturing start times over an unalterable minimum capturing period, and
    wherein respective pattern projection start times of the specific pattern time intervals are coupled to some or all of the capturing start times.

8. The driver assistance system according to claim 7, wherein a duration of one of the specific pattern time intervals substantially corresponds to a multiple of the unalterable minimum capturing period.

9. The driver assistance system according to claim 1, wherein the at least one geometric property comprises a position of at least part of the scene or a spatial distance of at least part of the scene from a reference point.

10. The driver assistance system according to claim 1, wherein the illumination unit is configured to increase a brightness of a subset of the actuatable pixels that are adjacent to the at least one subgroup of the actuatable pixels that are darkened, so as to increase a contrast of the predefined pattern.

11. The driver assistance system according to claim 1, wherein the illumination unit is configured so that the projecting of the predefined pattern is performed repetitively during pattern time intervals, the capturing of the image is performed repetitively during image capture periods, and a start time of a respective one of the pattern time intervals is time-offset before a start time of a respective one of the image capture periods.

12. The driver assistance system according to claim 1, wherein the illumination unit is configured so that the projecting of the predefined pattern is performed repetitively during pattern time intervals, the capturing of the image is performed repetitively during image capture periods, and a start time of a respective one of the pattern time intervals is time-offset after a start time of a respective one of the image capture periods.

13. A method comprising steps:
    illuminating a scene in surroundings of a vehicle by projecting a total area consisting of a total number of actuatable pixels of an illumination unit of the vehicle, wherein the illuminating comprises projecting a predefined pattern onto the scene by darkening at least one subgroup of the actuatable pixels, and wherein a number of the actuatable pixels of the at least one subgroup that are darkened for projecting the predefined pattern is less than half the total number of the actuatable pixels;
    capturing an image of at least part of the scene; and
    computing at least one geometric property of the scene from the captured image and the predefined pattern.

14. The method according to claim 13, wherein the illumination unit comprises a projection-type headlight of the vehicle, which projects the predefined pattern via a micromirror array.

15. The method according to claim 13, further comprising increasing a brightness of a subset of the actuatable pixels that are adjacent to the at least one subgroup of the actuatable pixels that are darkened, so as to increase a contrast of the predefined pattern.

16. The method according to claim 13, wherein the projecting of the predefined pattern is performed repetitively during pattern time intervals, the capturing of the image is performed repetitively during image capture periods, and a start time of a respective one of the pattern time intervals is time-offset before a start time of a respective one of the image capture periods.

17. The method according to claim 13, wherein the projecting of the predefined pattern is performed repetitively during pattern time intervals, the capturing of the image is performed repetitively during image capture periods, and a start time of a respective one of the pattern time intervals is time-offset after a start time of a respective one of the image capture periods.

18. The method according to claim 13, further comprising controlling a driver assistance system of the vehicle in response to and dependent on the at least one geometric property.

* * * * *